US010326759B2

(12) United States Patent
Barbosa et al.

(10) Patent No.: US 10,326,759 B2
(45) Date of Patent: Jun. 18, 2019

(54) WEBSITE AUTHENTICATION USING AN INTERNET-CONNECTED DEVICE

(71) Applicants: Nata Miccael Barbosa, Joinville (BR); Yang Wang, Jamesville, NY (US)

(72) Inventors: Nata Miccael Barbosa, Joinville (BR); Yang Wang, Jamesville, NY (US)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 15/563,661

(22) PCT Filed: Apr. 2, 2016

(86) PCT No.: PCT/US2016/025783
§ 371 (c)(1),
(2) Date: Oct. 2, 2017

(87) PCT Pub. No.: WO2016/161398
PCT Pub. Date: Oct. 6, 2016

(65) Prior Publication Data
US 2018/0083959 A1 Mar. 22, 2018

Related U.S. Application Data

(60) Provisional application No. 62/142,037, filed on Apr. 2, 2015.

(51) Int. Cl.
*H04L 29/06* (2006.01)
*H04L 9/32* (2006.01)
(Continued)

(52) U.S. Cl.
CPC ........ *H04L 63/0853* (2013.01); *H04L 9/3228* (2013.01); *H04L 63/083* (2013.01);
(Continued)

(58) Field of Classification Search
CPC . H04L 63/0853; H04L 9/3228; H04L 63/083; H04L 63/0861; H04L 63/18; H04W 12/06; H04W 88/02
See application file for complete search history.

(56) References Cited

U.S. PATENT DOCUMENTS 6,993,658 B1 * 1/2006 Engberg .................. G06F 21/43
379/114.2
8,479,007 B2 7/2013 Tame
(Continued)

OTHER PUBLICATIONS

Nobayashi et al Development of Single Sign-On System with Hardware Token and Key Management Server, Aug. 2007, Second International Conference on Systems and Networks Communications, pp. 73-79 (Year: 2007).*
(Continued)

*Primary Examiner* — Kenneth W Chang
(74) *Attorney, Agent, or Firm* — Bond Schoeneck and King PLLC; David Nocilly; George McGuire (57) ABSTRACT

The invention is an authentication framework that enables a user to log in to a website using an Internet-connected device, such as smartphone, smart watch, smart glasses, or tablet, while browsing on a computer. The framework makes it easier for people with certain disabilities to log in to a website, such as by removing the mandatory step of entering usernames and passwords while giving users multiple options through which they are establish their identity using Internet-connected devices. For example, gyroscope, camera, microphone, or the accelerometer can be used to provide credentials. This approach of the framework greatly reduces the number of barriers that a user with disability encounters when trying to use password-based authentication on the Internet.

15 Claims, 4 Drawing Sheets

(51) Int. Cl.
  *H04W 88/02* (2009.01)
  *H04W 12/06* (2009.01)
(52) U.S. Cl.
  CPC .......... *H04L 63/0861* (2013.01); *H04L 63/18* (2013.01); *H04W 12/06* (2013.01); *H04W 88/02* (2013.01)

(56) References Cited

U.S. PATENT DOCUMENTS

| | | | |
|---|---|---|---|
| 8,560,841 | B2 | 10/2013 | Chin et al. |
| 8,683,562 | B2 * | 3/2014 | Ting ................ G06F 21/35 726/6 |
| 9,027,097 | B2 | 5/2015 | Bortz et al. |
| 2003/0046551 | A1 * | 3/2003 | Brennan ............ G06F 21/34 713/185 |
| 2006/0031683 | A1 * | 2/2006 | Marion ............. G06F 21/335 713/185 |
| 2010/0162377 | A1 * | 6/2010 | Gonzalez ........... G06F 21/31 726/9 |
| 2010/0211796 | A1 * | 8/2010 | Gailey ............. G06F 21/31 713/182 |
| 2012/0124662 | A1 | 5/2012 | Baca et al. |

OTHER PUBLICATIONS

International Search Report Form PCT/ISA/210, International Application No. PCT/US16/25783, pp. 1-9, dated Jul. 16, 2016.

* cited by examiner

WEBSITE AUTHENTICATION USING AN INTERNET-CONNECTED DEVICE

BACKGROUND OF THE INVENTION

1. Field of the Invention

The present invention relates to website authentication frameworks and, more particularly, to a framework involving the use of an Internet-connected device to avoid manually inputting information into website login screens.

2. Description of the Related Art

Password-based authentication is the standard mechanism for logging in to websites. While the use of passwords is associated with numerous user experience and security issues, alternative authentication mechanisms are not necessarily better than password schemes. The tasks imposed by a password-based workflow typically involve a number of challenges for web users, such as picking hard-to-guess passwords, detect phishing websites, installing updates/patches, and following security guidelines. These seemingly mundane tasks can be daunting for users with disabilities. Often, the restrictions imposed by assistive technologies hinder the user experience because of bad/inaccessible design. Additionally, certain features of assistive technologies may pose security threats to users when trying to log in to a website. For example, a blind user using screen reader software would need to wear earphones to protect his credentials from being overheard while typing, which then makes it more difficult for the blind user to detect observers. Indeed, users with disabilities face numerous issues with the otherwise simple task of filling out a basic login form.

Removing the act of typing/entering credentials on the computer can greatly improve the user experience of the password-based workflow that is the current standard on the web. Built-in features to remember credentials have been added to modern browsers and commercial password manager products are available in the market to overcome some of difficulties of the password-based workflow. However, these alternatives may only be helpful when user is trying to log in using the same computer. Moreover, anyone with unauthorized access to that computer's browser would be able to access the user's protected resources if the log in form is pre-filled with the user's credentials. Alternatively, if a user types in her credentials on a public or shared computer (e.g., in a public library or an Internet cafe), then there is a potential risk that the computer was infected with key logger software which can steal the user's credential.

Because of the mobility factor of many types of Internet-connected devices such as smart phones, they can offer many resources (e.g., gyroscope, accelerometer, magnetometer, camera, microphone, gravity sensors, fingerprint sensors) that allow for strategies that make use of one or more authentication factors (e.g. biometrics, passphrase, behavioral biometrics) to be used for logging in to a website, rather than imposing the task of filling out a login form to everyone. Accordingly, there is a need in the art for a framework that avoids the need to type or enter credentials into a computer by using the various strategies that are available to a user with a smartphone or internet connected smart device.

BRIEF SUMMARY OF THE INVENTION

The present invention is a system for authenticating access to a website that has a login page programmed to send a request for a one-time token and to broadcast the one-time token upon receipt, a communication server programmed to establish a secure channel with the login page, to receive the request for the one-time token from the login page, and to provide the one-time token to the login page, and a password manager associated with a mobile device and having a database for storing user credentials, wherein the password manager is programmed to receive the one-time token from the login page using a first predetermined strategy and to provide the one-time token to the communication server. The communication server is further programmed to receive the one-time token from the password manager and, if the one-time token is valid, provide the one-time token to the login page a second time. The login page is further programmed to send the populated login form to the communication server and the communication server is programmed to send the populated login form to the password manager. The first predetermined strategy is the use of the mobile device in a manner other than typing on a keyboard associated with the mobile. For example, the first predetermined strategy may be moving the mobile device is a predetermined manner. The first predetermined strategy may also be using the mobile device to record a sound played by the login page. The first predetermined strategy may also be using the mobile device to scan a barcode displayed by the login page.

The present invention is also a method of providing user credentials by sending a request for a one-time token from a login page to a communication server, establishing a secure channel between the login page and the communication server, sending a one-time token from the communication server to the login page, broadcasting the one-time token from the login page to a mobile device having a password manager and an associated database with predetermined user credentials, using a first predetermined strategy with the mobile device to read the one-time token, transmitting the one-time token from the password manager of the mobile device to the communication server, verifying the one-time token with the communication server and sending the verified one-time token to the login page, forwarding a request for credentials to the communication server if the verified one-time token matches the one-time token initially provided by the communication server, sending the request for credentials from the communication server to the password manager of the mobile device, asking the user to authenticate to the mobile device through a second predetermined strategy of using the mobile device, retrieving, decrypting and sending the login credentials to the communication server, and forwarding the login credentials from the communication server to send the login page. As discussed above, the second predetermined strategy is the use of the mobile device in a manner other than typing on a keyboard associated with the mobile, such as moving the mobile device is a predetermined manner, using the mobile device to record a sound played by the login page, or using the mobile device to scan a barcode displayed by the login page.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
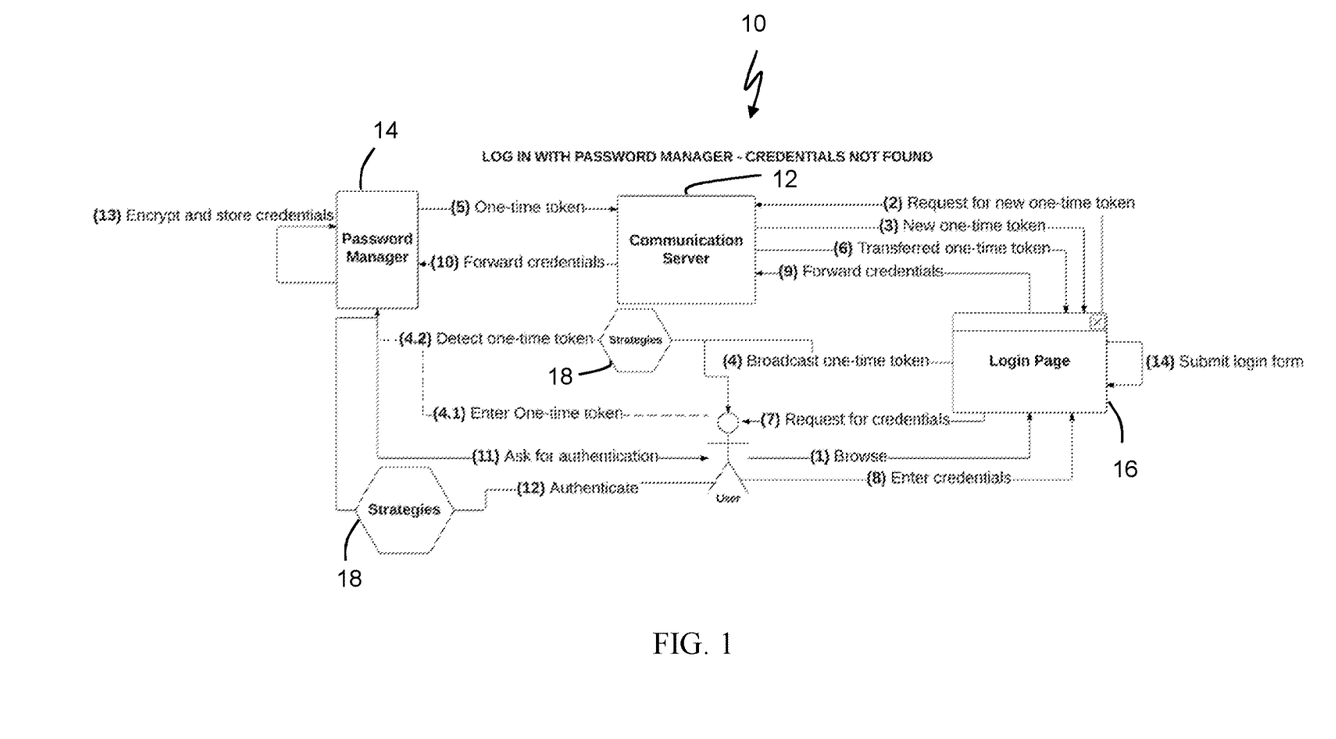
FIG. 1 is a schematic of the authentication flow in a framework according to the present invention when user credentials are not found.
Figure 2:
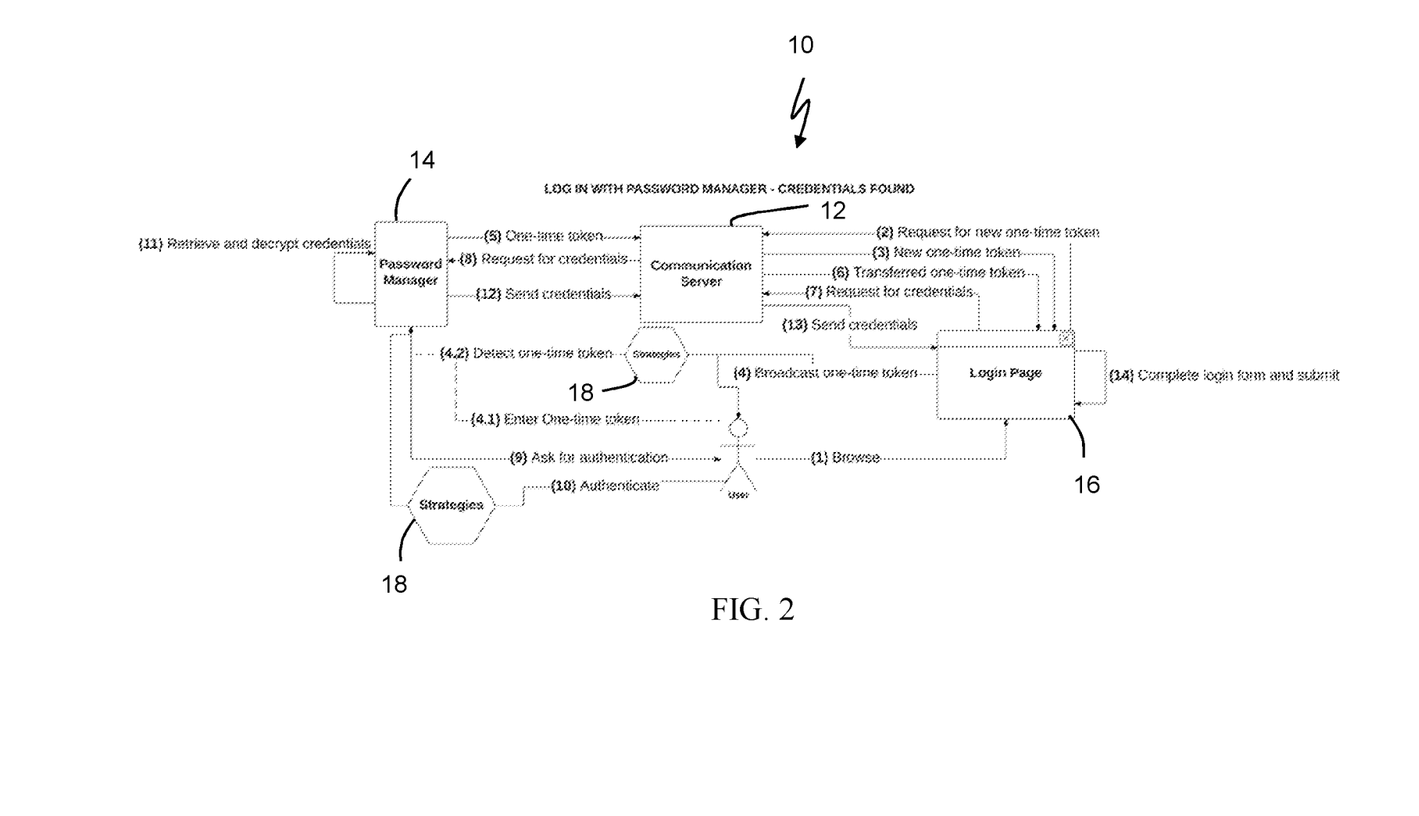
FIG. 2 is a schematic of the authentication flow in a framework according to the present invention when user credentials are found.
Figure 3:
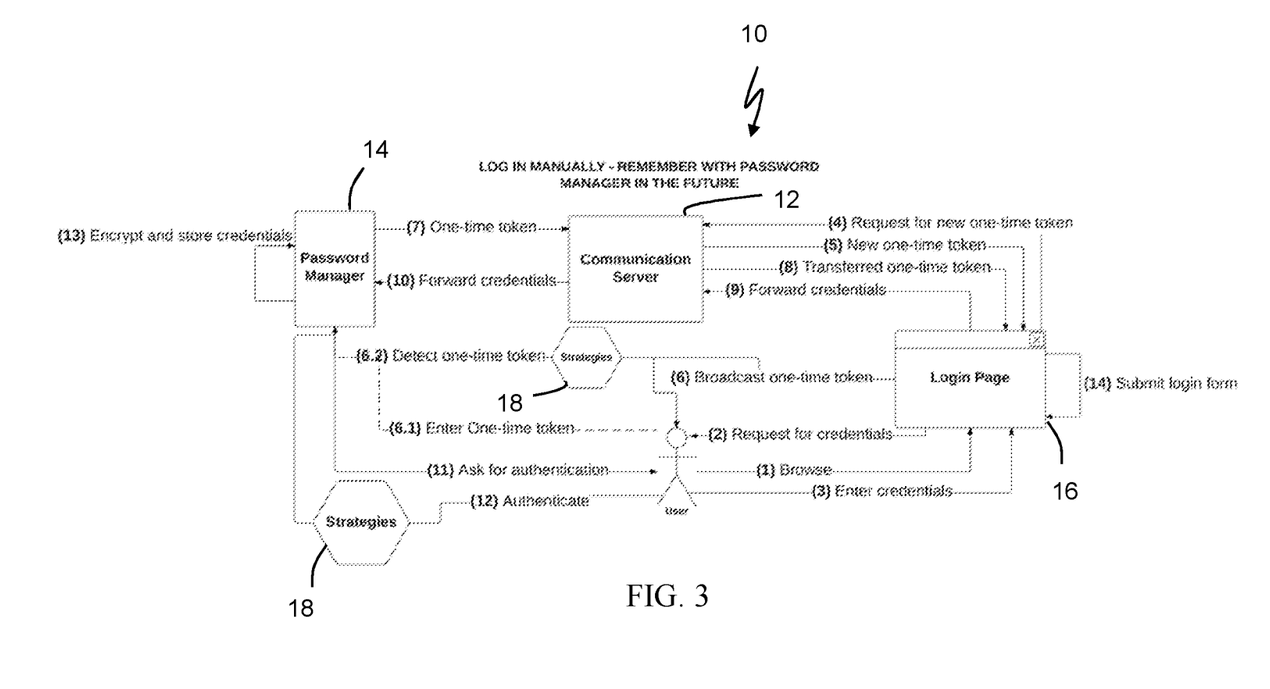
FIG. 3 is a schematic of the authentication flow in a framework according to the present invention when login is accomplished manually and remembered for the future.
Figure 4:
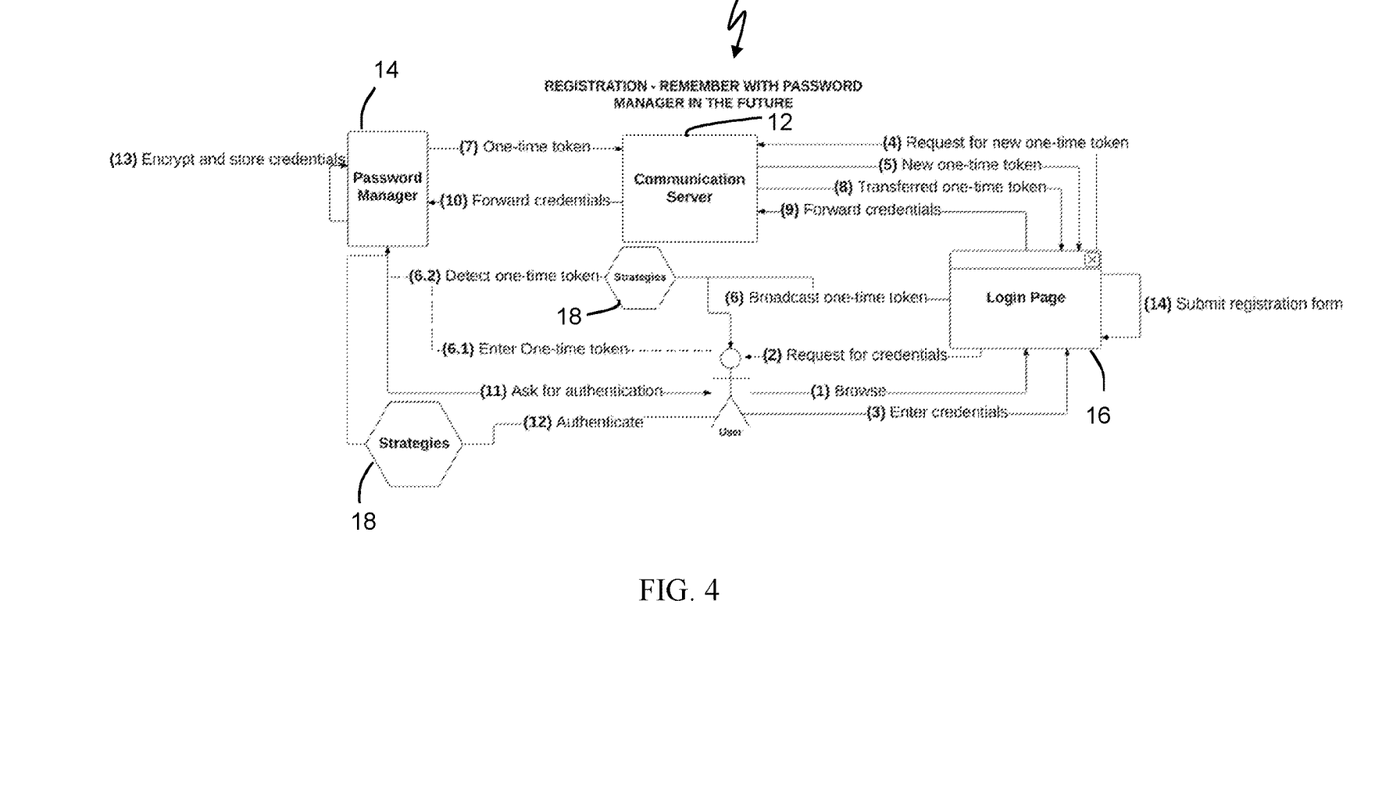
FIG. 4 is a schematic of the authentication flow in a framework according to the present invention with user registration.

Referring now to the drawings, wherein like reference numerals refer to like parts throughout, there is seen in FIGS. 1 through 4 a framework 10 that provides for a variety of authentication strategies in lieu of having to type user credentials into an Internet browser. Framework 10 can support a wide range of Internet-connected devices such as smartphones, tablets, and smart watches, and is merely illustrated in FIG. 1 using a smartphone as an example.

The present invention comprises an authentication framework that leverages user experience issues of password-based workflows through the use of features available on an Internet-connected device, such as a smartphone, a smart watch, smart glasses, or a tablet. More specifically, the framework reduces the need for typing passwords on a keyboard as much as possible by giving users alternatives to entering passwords when logging in to a website. The framework also provides a platform that allows a variety of strategies for authentication to be implemented and catered to a broad range of users, especially those with disabilities that greatly hinder their interaction when entering passwords on the web. The framework of the present invention relies on the Internet-connected device to be a personal password manager. In order for a user to access a protected website, the user can authorize sending the credentials (including their password) to the page that contains the login form through an authentication strategy that addresses the particular needs of the user. For example, a blind user could provide appropriate log in credentials to an email account by positioning a smartphone configured according to the framework in close proximity to the computer through which the user is attempting to access the email account and then shaking the smartphone in a predetermined manner or scanning a fingerprint.

The framework of the present invention has a universal design approach to web authentication and is easily extensible, thereby allowing developers to create and implement accessible strategies to transfer the authentication tokens from the login page to the mobile application for device pairing purposes as well as accessible strategies to authenticate a user to the mobile application on the Internet-connected device in order to transfer the login credential to the login page.

More particularly, framework 10 involves the use of a communication server 12 that creates a secure channel through which a password manager 14 and a login page 16 can communicate. Framework 10 thus includes a password manager 14 that stores user credentials and requires user authentication in order to authorize sending the credentials to the login page. Preferably, the password manager 14 is configured as a mobile application installed onto the Internet-connected device of a user. A user enters his or her credentials into login page 16 during an initial configuration and have the user credential provided to password manager 14 via communication server 12 before password manager 14 can provide the necessary authentication as described below. Alternatively, the user enters credentials into password manager 14 at an initial configuration. Framework 10 also includes a login page 16, which is simply the Internet website page that the user desires to access via a web browser on a computer. Login page 16 includes the login form that, once the appropriate information is provided by the user, will allow the user to access the particular application or website that the user is trying access by providing login credentials.

Login page 16 is configured to broadcast a one-time token for pairing with password manager 14 and then filling out the login form once credentials are received from password manager 14. The one-time token is used strictly to create a channel between password manager 14 and login page 16, and it is not intended to identify the user. Framework 10 further includes one or more strategies 18 that are used to facilitate the one-time token transfer from login page 16 to password manager 14, and to also to authenticate a user to password manager 14. Strategies 18 may be based on the various hardware capabilities of the Internet-connected device that go beyond the manual entry of credentials into a keypad, e.g., accelerometer, microphone, camera, gyroscope, GPS, biometrics, and combinations thereof, as well as based on visual or non-visual techniques, e.g. scanning a blinking computer screen, recording a sound played by the computer.

As seen in FIGS. 1 through 4, framework 10 implements a methodology that allows for a user to avoid the act of typing/entering credentials into a web browser of a computer while taking advantage of the strategies that are available to a user with an Internet-connected device. First, a user uses a web browser on a computer to access a login page 16. Second, login page 16 identifies whether there is either a login form or a registration form on the page, if that's the case, it requests a one-time pairing token from communication server 12. One-time token is a non-sequential, short, unique identifier, such a 9-character, randomly composed string randomly (e.g., AZaz0-9_#). One-time token is used strictly to create for identifying the communication channel between login page 16 and password manager 14. Third, communication server 12 generates and sends the requested one-time token to login page 16. Fourth, login page 16 broadcasts the one-time token received from communication server 12 and then the user either transfers the token to password manager 14 or password manager 14 reads the token being broadcast by login page 16, based on the previously described strategies available. For example, the one-time token may be broadcast by displaying QR Code that the user may scan with the smartphone to provide the one-time token to password manager 14. Alternatively, login page 16 may broadcast one-time token in a manner than password manager 14 can accept without user manipulation of the smartphone, such as a series of audible or even inaudible tones that can nevertheless be detected by the Internet-connected device. Fifth, the device transmits the one-time token to communication server 12 using the communication system of the smartphone. Sixth, communication server 12 verifies the validity of the one-time token and, if valid, sends one-time token to login page 16. Login page 16 then verifies that the second one-time token received from communication server 12 matches the one-time token originally provided to login page 16 by communication server 12. Seventh, in the event that login page 16 contains a registration form, then the user will be prompted whether or not to send the credentials to password manager 14 when the registration form is submitted. If the user chooses to do so, then the credentials will be sent to communication server 12 and communication server 12 will forward the credentials to password manager 14. Password manager 14 will ask authentication from the user based on strategies previously described, if authentication is successful, then password manager 14 will encrypt and store the credentials for the URL. If login page 16 contains a login form, the user will be asked if he or she wants to use password manager 14 to supply the credentials for login page 16. If the user chooses to do so, login page 16 sends a request for credentials for the current URL (e.g. site open on the computer) to communication server 12. Eighth, communication server 12 then sends the request for credentials to the password manager 14 via the communication system of the Internet-connected device. Ninth, password manager 14 requests authentication from the user. Tenth, the user authorizes password manager 14 to send credentials to login page 16, based on previously described strategies available on password manager 14. In the event that this is the credentials for the requested URL are not found in password manager 14 after successful authentication to password manager 14, the password manager will send a request for credentials to communication server 12. In this case, the password manager 14 is the one waiting for credentials and login page 16 is the one to send the credentials roles are switched. Communication server 12 will forward the request for credentials to the login page 16, the login page 16 will prompt the user to complete the login form manually on the login page 16. When completing and submitting the login form on login page 16, the user will be prompted whether or not to save the credentials on password manager 14. If the user chooses to do so, login page 16 will send credentials to communication server 12 and communication server 12 will forward the credentials to password manager 14. Password manager 14 will encrypt and store credentials for the URL. If login page 16 has been accessed before and credentials stored locally into the password manager 14 for given Internet address (i.e. website or domain), then the user simply needs to authorize password manager 14 to provide the appropriate locally stored credentials using appropriate strategy 18. For example, one acceptable strategy 18 may comprise shaking the Internet-connected device (e.g., a smart phone) in a particular predetermined manner to provide user authentication. Eleventh, following successful user authentication to password manager 14, password manager 14 will retrieve and decrypt login credentials. Twelfth password manager 12 sends credentials to communication server 12. Thirteenth, communication server 12 sends the user credentials to login page 16, which automatically populates the login form so that the user can log into the desired webpage. Framework 10 will also support automatically submitting the form once the login form is populated with the received credentials. Additionally, when the page loads, the user may choose not to complete the login form with password manager 14. In this case, the user will complete the login form manually on login page 16 and have the option to transfer the login credentials to password manager 14. If the user chooses to do so, then the pairing process is initiated and the same process described in the seventh step of this section as if the login page contained a registration form credentials are sent from login page 16 to communication server 12, then from communication server 12 to password manager 14. Password manager 14 asks the user for authentication based on previously described strategies 18 and encrypts the login credentials and saves it for future use upon successful authentication to password manager 14. This and the other different user scenarios represented in FIGS. 1 to 4 may cause steps described in this description to change order.

Communication between communication server 12, password manager 14, and login page 16 is preferably accomplished through the Transport Layer Security (TLS) protocol. Login page 16 may be implemented using a JavaScript library that is included as part of a particular webpage by the webpage developers or via a browser plugin, in which case the pairing between login page 16 and password manager 14 may last longer (i.e. the browser plugin and the password manager listen to the same secure channel of communication server as long as they hold the pairing token), by storing the one-time pairing token locally on password manager 14 and on the browser plugin, so that a new device pairing between login page 16 and password manager 14 may not be necessary, thus improving the user experience. The replacement of device pairing task when a browser plugin is implemented is characterized by a notification being sent to password manager 14 so that the user will know that login page 16 is requesting login credentials. Alternatively, JavaScript library on login page 16 can use built-in browser features to persist said token in local storage for the same purposes (e.g. skip pairing login page 16 and password manager 14).

Password manager 14 is preferably a mobile application, such as an Android or iOS application on an Internet-connected device. Password manager 14 is programmed to encrypt and store credentials locally on the device. Password manager 14 is also programmed to read the one-time token being broadcast by the login page 16 to establish communication with communication server 12 or login page 16 directly if no server 12 (e.g. through hardware available in strategies 18). Password manager 14 is further programmed to perform authentication, either by giving the user the option to choose a strategy or by inferring the appropriate strategy through machine learning techniques. Acceptable strategies are ways of input/output that a user can use to interact with password manager 14. For example, a blind user could speak a passphrase so that a voice recognition strategy can authenticate the user or scan a fingerprint for authentication. Password manager 14 is additionally programmed to sending authorized credentials to login page 16 via the communication server 12.

Communication server 12 may be configured as a Web Sockets server and implemented with Node.js or any server-side language or configuration. Communication server 12 is programmed to generate new one-time tokens, creating a secure communication channel between the mobile application acting as password manager 14 and the JavaScript Library or browser plugin acting as login page 14. Communication server 12 is also programmed to receive one-time tokens from password manager 14 and to send them to the JavaScript library or browser plugin of login page 14 for handshaking. Communication server 12 is further programmed to receive credentials from password manager 14 and send them to login page 16 (or vice versa).

Once login page 16 with the JavaScript library is loaded, login page 16 is going to give the user the option to use their personal password manager 14, which may be available through their Internet-connected devices to log in. If the user chooses to do so, login page 16 will request a new one-time token from Web Sockets communication server 12. Once this request is received, Web Sockets communication server 12 places the JavaScript library (a Web Sockets client) of login page 16 into a room. The JavaScript library then starts waiting for mobile application password manager 14 to join the same room, as identified by the one-time token alone, which will happen once the Web Sockets communication server 12 gets a token from the password manager 14 and the token is a valid token (i.e., it was previously generated by Web Sockets communication server 12 and broadcasted by the JavaScript library of login page 16).

Password manager 14 reads the token being broadcast by login page 16, either through user input or a through a strategy (e.g. QR Code scanning, audio passphrase, high-frequency audio tones, etc.). Framework 10 thus establishes a channel of communication between login page 16 and password manager 14 in a way that password manager 14 and login page 16 know where to send credentials by using a token string that can be represented in many forms, as long as there is a mechanism (i.e. strategy) to either allow the user to understand and transfer it to password manager 14 or to allow password manager 14 to read it directly from login page 16 (or vice versa). Once password manager 14 reads the token, it will send the token to Web Sockets communication server 12. If there is a match between the token and the room previously created for the JavaScript library of login page 16, the smartphone with password manager 14 will be allowed to join the room. When the Internet-connected device with password manager 14 joins the room, Web Sockets communication server 12 will tell the JavaScript library of login page 16 that password manager 14 has joined in by sending the token it just received from password manager 14. Once password manager 14 and the JavaScript library of login page 16 are in the same room, it is possible to send data back and forth between login page 16 (JavaScript Library) and password manager 14. When a browser plugin is implemented or browser built-in capabilities allow for local storage of information, the steps required to make password manager 14 and login page 16 join the same communication room through a token will only be necessary if there is no pairing token stored locally on the browser plugin. In this case, the pairing token will be stored locally after the first time and may expire or get replaced after a predetermined elapsed time. This approach will allow for the browser plugin and password manager 14 to stay in the same communication room for a longer period of time. The storage is not permanent or unique per login page or per browser (i.e. token could be replaced automatically or manually).

When JavaScript library of login page 16 receives a notification that a password manager 14 has joined the same room, it will stop waiting for a token. At this moment, if the token in memory matches the token received from the server, the JavaScript library of login page 16 will send the website domain requesting credentials for that URL to password manager 14. From this moment on, JavaScript library or browser plugin of login page 16 will start waiting for credentials.

At the same time, password manager 14 of the Internet-connected device receives a request to ask the user for authentication before decrypting and sharing credentials for the URL that was received from communication server 16 as well as the token from communication server 16 for an additional handshake. If the token does not match, the process may be restarted. If the token is valid, password manager 14 will stop waiting for new requests for credentials and will prompt the user to provide a predetermined authentication strategy 18. Strategies 18 may accommodate the particular conditions of a broad range of users. For example, a user with motion-impairment could speak a passphrase, thus combining voice recognition and the correct passphrase (two-factor authentication), rather than trying to shake the Internet-connected device in a predetermined way. Upon successful authentication, password manager 14 will review the origin URL and look for a match in local storage to determine whether valid credentials have been previously stored. If a match is not found in password manager 14, password manager 14 will send a request for credentials to communication server 12, which will forward this request to login page 16. Login page 16 will ask the user to complete the login form on the computer manually while password manager 14 waits for credentials. Once the login form is completed and submitted, the user is given the option to send the user credentials to password manager 14 for future use. Choosing to do so will make login page 16 forward the user credentials to communication server 12, which will forward the user credentials to password manager 14. Password manager 14 will then encrypt and store the user credentials for the URL and no longer wait for new credentials from that moment on.

If password manager 14 finds previously stored credentials, password manager 14 retrieves and decrypts stored credentials.

Password manager 14 sends the stored credentials to Web Sockets communication server 12 over TLS. Once Web Sockets communication server 12 receives the credentials from password manager 14, the credentials are sent to the JavaScript library or browser plugin of login page 16, which is waiting for credentials. Once the credentials are sent to the JavaScript library or browser plugin of login page 16, it will stop waiting for credentials and will automatically fill in and submit the login form so that the user is authenticated to the particular website. The particular web application server knows nothing about this process because it all happens on the client side, with the help of the JavaScript library or browser plugin of login page 16. Framework 10 preferably does not keep track of whether authentication was successful or not.

In use, the present invention thus allows a user that navigates to login page 16 that requires user credentials to supply the user credentials simply by electing to supply user credentials from a separate mobile device and then using the appropriate strategy on the mobile device when password manager 14 is contacted by the login page 16, e.g., scan a fingerprint. If login page 16 has not previously been configured, the user can simply enter the user credentials manually and elect to have the user credentials and the association with the particular login page 16 stored by password manager 14. Storage can be confirmed using an appropriate strategy, e.g., scan a fingerprint or scan a QR code on login page 16. Pairing can be done either at the beginning (when user chooses to use password manager 14 to fill the login form) or at the end (when users choose to remember the credentials with password manager 14). Credentials can thus come from both login page 16 and password manager 14. If coming from password manager 14, they will complete the login form of login page 16. If coming from login page 16, they will create or overwrite user credentials on password manager 14.

Framework 10 thus provides an extensible platform that incorporates various authentication mechanisms for serving the needs of a wide range of users. The standard workflow for logging in to a website still requires people to enter passwords, along with all known difficulties and challenges with passwords (e.g. password strength, remember passwords). Framework 10 simplifies the password management tasks and offers more authentication mechanisms that can better fit users' diverse needs, including the needs of impaired users.

What is claimed is:

1. A system for authenticating access to a website, comprising:
- a login page programmed to send a request for a one-time token and to broadcast said one-time token upon receipt;
- a communication server programmed to establish a secure channel with said login page, to receive the request for said one-time token from said login page, and to provide said one-time token to said login page;
- a password manager associated with a mobile device and having a database for storing user credentials, wherein the password manager is programmed to receive said one-time token from said login page and to provide said one-time token to said communication server;
- wherein the communication server is further programmed to receive said one-time token from said password manager and, if said one-time token is valid, provide said one-time token to said login page a second time;
- wherein said login page is further programmed to send a request for user credentials of said login page to said communication server if said one-time token received from said communication server the second time matches the one-time token previously received from said communication server;
- wherein said communication server is further programmed to provide said request for user credentials to said password manager and said password manager is further programmed to provide appropriate user credentials in response to a second predetermined strategy; and
- wherein said password manager is further programmed to send user credentials to said communication server and said communication server is programmed to send said user credentials to said login page.

2. The system of claim 1, wherein said first predetermined strategy comprises the use of said mobile device in a manner other than typing on a keyboard associated with said mobile.

3. The system of claim 2, wherein said first predetermined strategy comprises moving said mobile device is a predetermined manner.

4. The system of claim 2, wherein said first predetermined strategy comprises using said mobile device to record and process a sound played by said login page.

5. The system of claim 2, wherein said first predetermined strategy comprises using said mobile device to scan a barcode displayed by said login page.

6. The system of claim 2, wherein said second predetermined strategy comprises the use of said mobile device in a manner other than typing on a keyboard associated with said mobile.

7. The system of claim 2, wherein said second predetermined strategy comprises the use of biometrics.

8. The system of claim 2, wherein said second predetermined strategy comprises the use of a fingerprint.

9. A method of providing user credentials, comprising the steps of:
- sending a request for a one-time token from a login page to a communication server;
- establishing a secure channel between said login page and said communication server;
- sending a one-time token from said communication server to said login page;
- broadcasting said one-time token from said login page to a mobile device having a password manager and an associated database with predetermined user credentials;
- using said mobile device according to a first predetermined strategy to authorize reading said one-time token;
- transmitting said one-time token from said password manager of said mobile device to said communication server in response to said first predetermined strategy;
- verifying said one-time token with said communication server and sending said verified one-time token to said login page;
- providing a request for user credentials from said login page to said communication server if said verified one-time token matches said one-time token initially provided by said communication server;
- sending said request for user credentials from said communication server to said password manager of said mobile device;
- providing user credentials from said password manager to said communication server in response to a second predetermined strategy of using said mobile device;
- sending said user credentials to said communication server; and
- forwarding said user credentials from said communication server to said login page.

10. The method of claim 9, wherein said first predetermined strategy comprises the use of said mobile device in a manner other than typing on a keyboard associated with said mobile.

11. The method of claim 10, wherein said first predetermined strategy comprises moving said mobile device is a predetermined manner.

12. The method of claim 11, wherein said first predetermined strategy comprises using said mobile device to record and process sound played by said login page.

13. The method of claim 12, wherein said first predetermined strategy comprises using said mobile device to scan a barcode displayed by said login page.

14. The method of claim 10, wherein said second predetermined strategy comprises the use of said mobile device in a manner other than typing on a keyboard associated with said mobile.

15. The system of claim 14, wherein said second predetermined strategy comprises the use of biometrics.

* * * * *